(12) United States Patent
Miglietta et al.

(10) Patent No.: US 12,439,573 B2
(45) Date of Patent: Oct. 7, 2025

(54) WEARABLE DEVICE CONTROL MODULE WITH ELECTROSTATIC DISCHARGE (ESD) PROTECTION

(71) Applicant: Bose Corporation, Framingham, MA (US)

(72) Inventors: James Piper Miglietta, Stow, MA (US); Daniel D. Gonsalves, Hudson, NH (US)

(73) Assignee: Bose Corporation, Framingham, MA (US)

( * ) Notice: Subject to any disclaimer, the term of this patent is extended or adjusted under 35 U.S.C. 154(b) by 246 days.

(21) Appl. No.: 18/126,513

(22) Filed: Mar. 27, 2023

(65) Prior Publication Data

US 2024/0334666 A1  Oct. 3, 2024

(51) Int. Cl.
| | |
|---|---|
| C09D 5/24 | (2006.01) |
| G06F 1/16 | (2006.01) |
| G06F 1/18 | (2006.01) |
| H04R 1/10 | (2006.01) |
| H05K 9/00 | (2006.01) |

(52) U.S. Cl.
CPC ............. H05K 9/0067 (2013.01); C09D 5/24 (2013.01); G06F 1/163 (2013.01); G06F 1/182 (2013.01); H04R 1/1091 (2013.01)

(58) Field of Classification Search
CPC .......... H05K 9/00; H05K 9/0067; G06F 1/16; G06F 1/18; H04R 1/10; H04R 5/033; H04R 25/00; H05F 3/02

USPC .................................................. 361/212, 220
See application file for complete search history.

(56) References Cited

U.S. PATENT DOCUMENTS

| | | | | |
|---|---|---|---|---|
| 4,456,800 | A * | 6/1984 | Holland | H05K 1/0215 |
| | | | | 200/305 |
| 2011/0007929 | A1* | 1/2011 | Rabu | H04R 1/1033 |
| | | | | 381/380 |
| 2013/0308787 | A1* | 11/2013 | Stanley | H01H 9/0228 |
| | | | | 381/74 |
| 2015/0216024 | A1 | 7/2015 | Kwong | |
| 2015/0351207 | A1* | 12/2015 | Tung | H05F 1/02 |
| | | | | 156/278 |
| 2019/0046794 | A1* | 2/2019 | Goodall | A61N 1/36014 |

OTHER PUBLICATIONS

PCT International Search Report and Written Opinion for International Application No. PCT/US2024/015321, dated Aug. 5, 2024, 18 pages.

* cited by examiner

*Primary Examiner* — Danny Nguyen
(74) *Attorney, Agent, or Firm* — Hoffman Warnick LLC (57) ABSTRACT

Various aspects include wearable devices with electrostatic discharge (ESD) mitigating features. In some examples, a control module is configured to connect to a wearable device, the control module including: a housing having at least one electrostatic discharge (ESD) ingress location, an electronic component in the housing, and a shield plate contained in the housing and connected to ground, the shield plate providing ESD protection for the electronic component.

23 Claims, 7 Drawing Sheets

WEARABLE DEVICE CONTROL MODULE WITH ELECTROSTATIC DISCHARGE (ESD) PROTECTION

TECHNICAL FIELD

This disclosure generally relates to electronic devices. More particularly, the disclosure relates to control modules that provide electrostatic discharge (ESD) protection.

BACKGROUND

Electronic devices such as audio headsets can be prone to electrostatic discharge (ESD) events. In particular, electronic devices used in aviation, military applications, industrial applications, etc., can be prone to electrostatic charge buildup. This buildup can cause ESD events that negatively impact performance of the electronic devices.

SUMMARY

All examples and features mentioned below can be combined in any technically possible way.

Various implementations of the disclosure include wearable devices with electrostatic discharge (ESD) mitigating features. In particular cases, the wearable devices includes wearable audio devices such as wearable aviation devices.

In some particular aspects, a control module is configured to connect to a wearable device, the control module including: a housing having at least one electrostatic discharge (ESD) ingress location, an electronic component in the housing, and a shield plate contained in the housing and connected to ground, the shield plate providing ESD protection for the electronic component.

In certain particular aspects, a control module is configured to connect to an aviation headset. The control module includes: a housing, an electronic component in the housing, a physical interface button on the housing proximate to an electrostatic discharge (ESD) ingress location, and a grounding element coupled to the physical interface button and configured to provide ESD protection for the ESD ingress location, where the grounding element provides ESD protection for the housing and aids in compliance with an ESD protection standard for the aviation headset.

Implementations may include one of the following features, or any combination thereof.

In certain aspects, the control module further includes a conductive paint on at least a portion of the shield plate.

In some cases, the control module further includes a conductive paint proximate the at least one ESD ingress location and connected to ground, the conductive paint providing ESD protection for the electronic component.

In particular aspects, the conductive paint at least partially surrounds the at least one ESD ingress location.

In certain implementations, the at least one ESD ingress location comprises a set of holes, and the conductive paint at least partially fills one or more of the set of holes. In certain cases, the conductive paint coats at least a portion of the set of holes.

In some aspects, the control module further includes a device connector in the housing electrically connected to the conductive paint, wherein the device connector includes a conductive gasket extending through an opening in the housing, wherein the conductive gasket provides a system ground connection.

In particular cases, the device connector includes a universal serial bus (USB) connector.

In certain aspects, the conductive gasket includes conductive silicone.

In some implementations, the at least one ESD ingress location includes one or more of: an external connector location, a gap between sections of the housing, a seam in the housing, or a vent in the housing.

In some cases, the shield plate is shaped to at least partially surround the at least one ESD ingress location in the housing.

In particular aspects, the shield plate is shaped to at least partially surround a plurality of the ESD ingress locations in the housing.

In certain implementations, the control module further includes a digital electronics circuit board and an analog electronics circuit board, where the shield plate is configured to divert ESD around the digital electronics circuit board to discharge via the analog electronics circuit board.

In some aspects, the digital electronics circuit board includes memory and a communications chip. In some cases, the communications chip includes a Bluetooth communications chip.

In particular cases, the control module further includes: a set of physical interface buttons on the housing for receiving user interface commands, and co-molded elastomer surrounding each of the physical interface buttons on the housing for mitigating ESD ingress.

In some cases, the wearable device includes an aviation headset.

In certain aspects, the shield plate provides ESD protection for the housing and aids in compliance with an ESD protection standard for the aviation headset.

In particular implementations, the ESD protection standard is characterized by at least 15 kilovolts (kV) of ESD protection.

In some aspects, the grounding element includes a ground ring at least partially surrounding the physical interface button.

In certain cases, the grounding element includes a set of ground pins extending from an internal surface of the physical interface button.

In some implementations, the internal surface opposes an external surface that is visible from an exterior of the housing.

In certain aspects, the control module further includes an insulator at least partially surrounding the physical interface button.

In particular cases, the grounding element is coupled with a system ground for the aviation headset.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to control modules for wearable devices that provide electrostatic discharge (ESD) protection. In certain cases, aspects of the disclosure relate to control modules for aviation headsets that provide ESD protection for those headsets. In certain cases, the control modules include a shield plate for diverting ESD from an ESD ingress location away from electronic components. In some of these examples, a portion of the control module also includes a conductive paint for diverting electrostatic discharge away from electronic components in the module housing. In certain additional cases, the control modules include a grounding element coupled with a physical interface button to provide ESD protection for electronic components from an ESD ingress location proximate the physical interface button.

As noted herein, a control module with an ESD protection feature(s) can be beneficially deployed in an aviation device such as an aviation headset. Certain environments such as aviation environments are prone to electrostatic build-up, for example, due to dry cabin air, dry surfaces in the cabin, and prolonged seating and shifting within a seat by an occupant (e.g., pilot). The build-up of significant electrostatic charge can cause large discharge events, also called ESD events herein. For example, when a pilot shifts in a seat, or gets out of a chair after prolonged seating, electrostatic charge built up in the pilot's headset may discharge proximate to the headband, earcups, boom microphone, etc. If such an ESD event is directed to electronics in the headset and/or control module, that event can be significant enough to interrupt audio communications, produce garbled audio inputs or outputs to the headset, and/or cause a failure in one or more of the communications and/or data connection components in the headset. Various implementations aid in ESD routing away from such components in a headset and/or control module, enhancing compliance with aviation safety standards as well as improving headset performance.

Commonly labeled components in the FIGURES are considered to be substantially equivalent components for the purposes of illustration, and redundant discussion of those components is omitted for clarity.

Aspects and implementations disclosed herein may be applicable to a wide variety of electronic devices. Particular examples of electronic devices include wearable audio devices and related control modules, connectors, modular components, auxiliary components, data connectors, audio connectors, etc. It is understood that any number of electronic devices that build up electrostatic charge can benefit from the disclosed implementations.

In some cases, such as where the electronic device includes a wearable audio device, the wearable audio devices can take various form factors, such as headphones (whether on or off ear), headsets, watches, eyeglasses, audio accessories or clothing (e.g., audio hats, audio visors, audio jewelry), neck-worn speakers, shoulder-worn speakers, body-worn speakers, etc. Some aspects disclosed may be particularly applicable to personal (wearable) audio devices such as over-ear headphones, on-ear headphones, in-ear headphones (also referred to as earbuds), audio eyeglasses or other head-mounted audio devices.

The wearable audio devices described according to various implementations can include features found in one or more other wearable electronic devices, such as smart glasses, smart watches, etc. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

As noted herein, conventional electronic devices (e.g., control modules, and/or modular wearable audio devices) can be subject to the accumulation of electrostatic charges, which ultimately discharge to a least-resistive path. These electrostatic charges can negatively impact performance and/or cause safety concerns for users, particularly in aviation settings.

Various implementations include control modules configured to connect to a wearable device. The control module includes a housing with at least one ESD ingress location and an electronic component. In certain cases, the control module includes a shield plate contained in the housing and connected to ground for providing ESD protection from the electronic component. In some of these cases, the control module further includes a conductive paint on a portion of the shield plate and/or proximate the ESD ingress location. In further implementations, the housing includes a physical interface button that is proximate an ESD ingress location on the housing, and a grounding element coupled to the physical interface button for providing ESD protection for the ESD ingress location.

Some example implementations relate to control modules for wearable devices, e.g., wearable audio devices. In certain examples, the wearable audio devices include aviation headsets. Aviation headsets are used by pilots in both general aviation and commercial aviation. Such headsets can be connected to aircraft communication systems, for example to communicate with air-traffic control (ATC) or with other pilots. The headsets can also be used as a public addressing system, for example, for the pilots to speak with passengers on board the aircraft. The aircraft communication systems typically include an analog communication system such as an intercom. In some cases, such an intercom system can be configured to communicate over the very-high-frequency (VHF) bands (e.g., 18 MHz to 136.975 MHz) wherein each channel is separated from the adjacent ones by a band of pre-specified width (e.g., 8.33 kHz in Europe, 25 kHz elsewhere). An analog modulation technique such as amplitude modulation (AM) can be used for the communications, and the conversations may be performed in simplex mode. In some cases, for example, for trans-oceanic flights, other frequency bands such as high-frequency (HF) bands can be used for satellite communications. Aviation headsets may be used, for example, by pilots and air-traffic controllers to communicate with one another.

Figure 1:
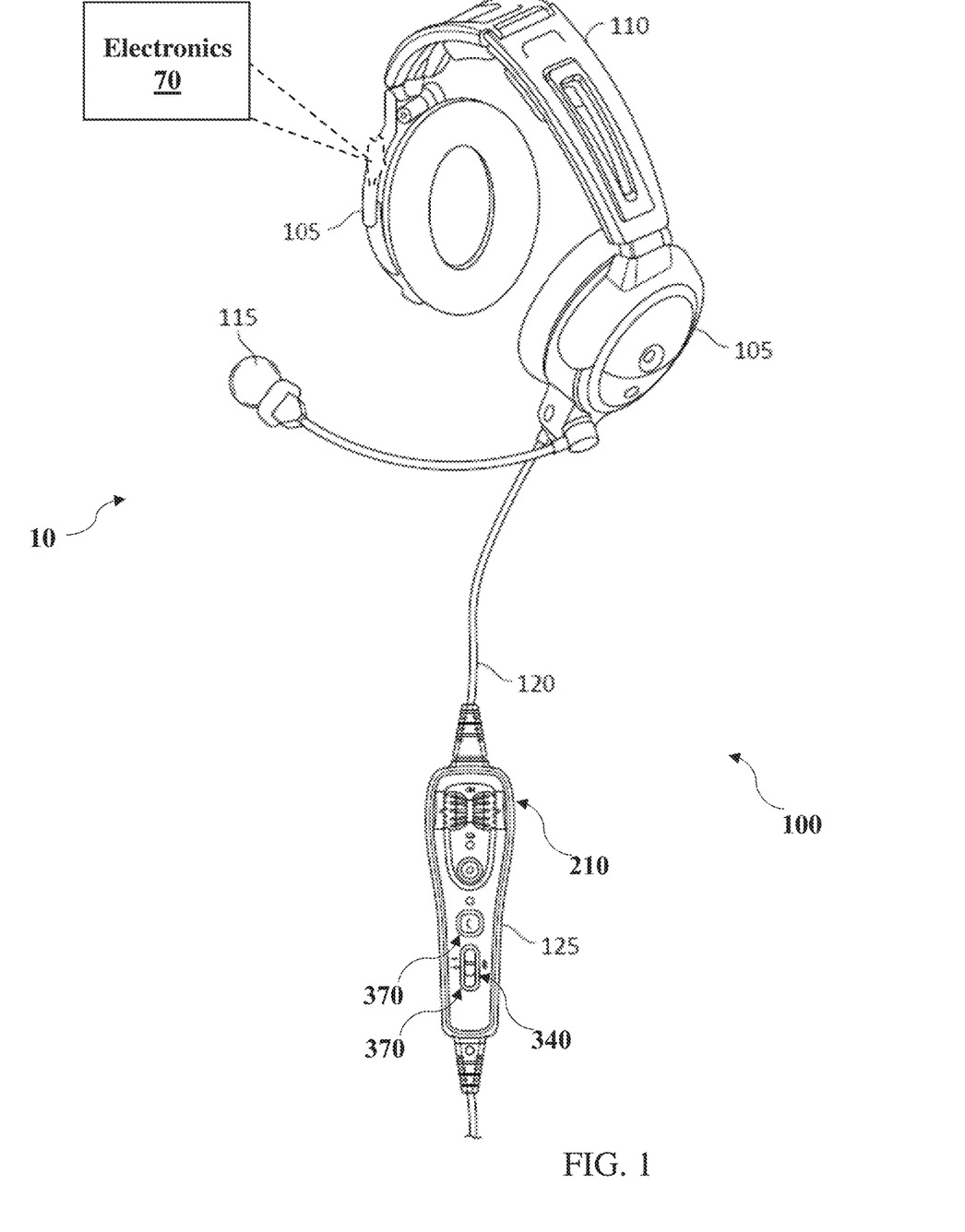
FIG. 1 is a schematic depiction of an audio device according to various implementations.

An example of a wearable audio device 10 that includes an aviation headset 100 is shown in FIG. 1. In particular cases, the headset 100 includes a frame that has at least one earpiece (e.g., ear-cup) 105 on each side, which fits on, around, or over the ear of a user. In some cases, the frame is optional, such that the earpiece 105 is either tethered or wirelessly connected to other components in the wearable audio device 10. Each of the ear-cups 105 houses acoustic transducers or speakers. The headset 100 also includes a headband (e.g., an over-the-head bridge) 110 for connecting the two earpieces (e.g., ear-cups) 105. In various implementations, the headset 100 is configured to position at least one, and in some cases both, earpieces 105 proximate ears of the user. For example, the headset 100 (and other headset forms of audio device 10 described herein) can be configured, when worn by a user, to position the earpiece(s) 105 proximate to a user's ear. In certain cases, this proximity includes positioning the earpiece(s) 105 on or over the ears (e.g., using earcups), in the ears (e.g., using earbuds), resting on the ears (e.g., using ear hooks), etc. In some cases, proximate positioning results in full, partial, or no occlusion of the user's ear.

In some implementations, an electronic component (e.g., a microphone such as a boom microphone) 115 may be physically connected to one of the ear-cups 105. The headset 100 can be connected to the aircraft intercom system using the connecting cable 120, which may also include a control module 125 that includes one or more controls for the headset 100. In certain cases, the analog signals to and from the aircraft intercom system are transmitted through the wired connection provided by the connecting cable 120. In other cases, or in additional cases, the headset 100 can include electronics 70, such as control chips and/or circuitry, electro-acoustic transducer(s), microphones and associated modules, power components such as batteries and/or connectors, interface components such as capacitive touch interface components, etc. In particular cases, the electronics 70 include a controller coupled with an electro-acoustic transducer, where the controller is also configured to connect with an electronic component when in a locked position with the audio device 10.

It is further understood that electronics 70 can include other components not specifically depicted in the accompanying FIGURES, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. Electronics 70 can also include motion and/or position tracking components, such as optical tracking systems, inertial measurement units (IMUs) such as a microelectromechanical system (MEMS) device that combines a multi-axis accelerometer, gyroscope, and/or magnetometer, etc.

While the example in FIG. 1 illustrates an aviation headset that includes around-ear ear-cups, aviation headsets having other form-factors, including those having in-ear headphones or on-ear headphones, are also compatible with the technology described herein. In an example involving in-ear headphones, the over-the-head bridge may be omitted, and the boom microphone may be attached to the user via the headset or via a separate structure. Also, the term headset, as used in this document, includes various types of acoustic devices that may be used for aviation purposes, including, for example, earphones and earbuds. Additional headset features are disclosed, for example, in U.S. patent application Ser. No. 15/238,259 ("Communications Using Aviation Headsets," filed Aug. 16, 2016), which is incorporated herein by reference in its entirety.

It is further understood that any component described as connected or coupled to another component in the audio device 10 or other systems disclosed according to implementations may communicate using any conventional hardwired connection and/or additional communications protocols. In some cases, communications protocol(s) can include a Wi-Fi protocol using a wireless local area network (LAN), a communication protocol such as IEEE 802.11 b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio device 10 are configured to communicate using one or more conventional wireless transceivers.

Figure 2:
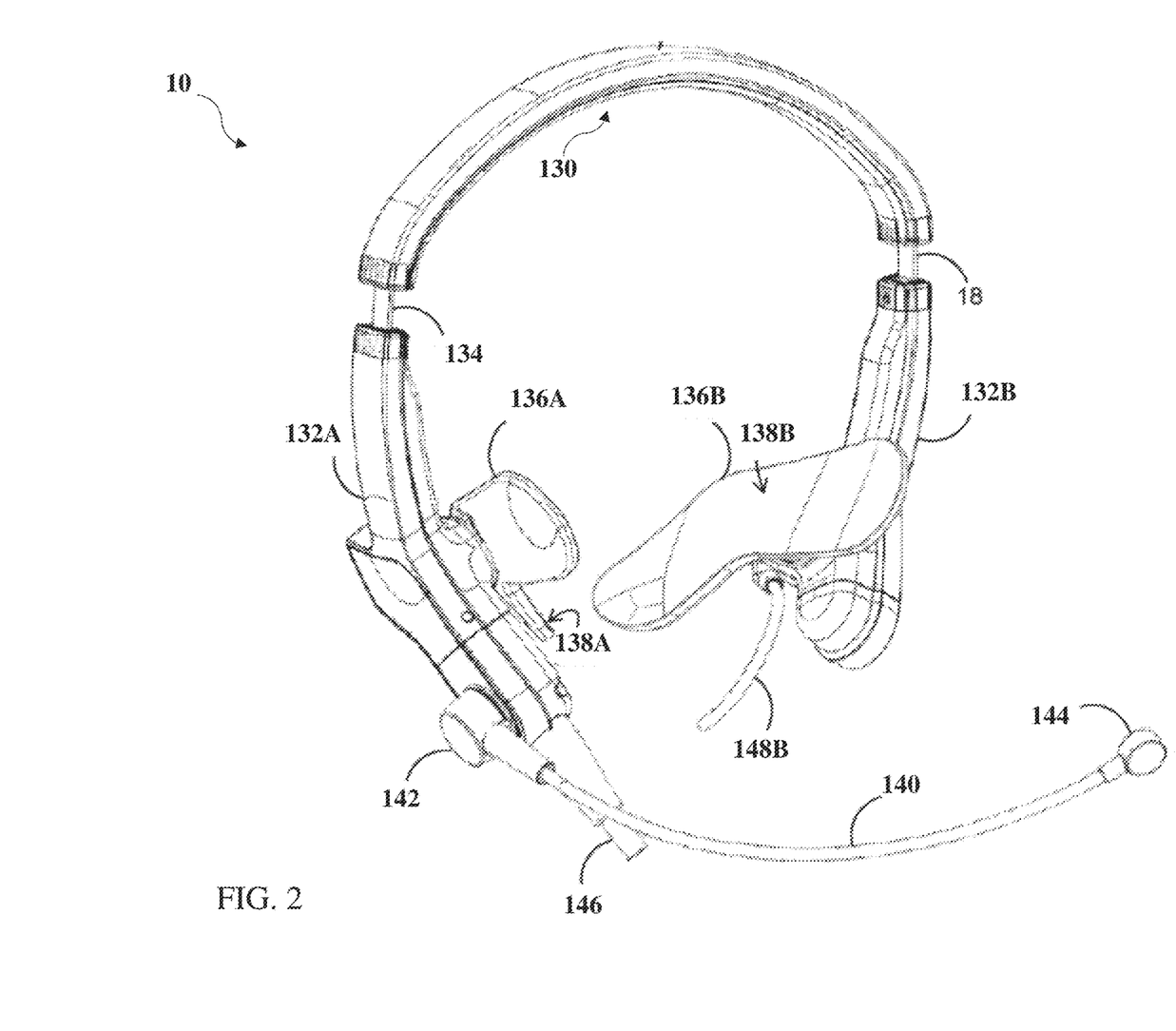
FIG. 2 is a schematic depiction of another audio device according to various implementations.

It is understood that the wearable audio devices 10 according to various implementations can take additional form factors. For example, FIG. 2 shows a wearable audio device 10 in the form of a personal communications headset 10 (e.g., an aviation headset). Reference numbers followed by an "A" or a "B" indicate a feature that corresponds to the right side or the left side, respectively, of the audio device 10. The audio device 10 includes a headband having an arcuate section 130, a right end and a left end. A right housing 132A and a left housing 132B are located at the right end and the left end, respectively, of the headband. The arcuate section 130 serves as an over-the-head bridge between the right and left housings 132. A spring band 134 (e.g., spring steel) extends from the right housing 132A, through the arcuate section 130 and to the left housing 132B. The spring band 134 provides a clamping force to move the housings 132 toward each other (approximately along a horizontal plane through the wearer's head) while the headband is worn by a user. The right and left housings 132 can be moved a distance either up and toward or down and away from the arcuate section 130 to accommodate a smaller or larger head, respectively.

A pad (right pad 136A or left pad 136B, generally 136) is attached to each housing 132 and is used to comfortably secure the headset 10 to the head. As used herein, a "pad" means a compliant member that can compress and/or deform under an applied pressure and that is configured for contact with the head of a user in a manner that supports the headband. In some cases, when the audio device (headset) 10 is worn on the head, each pad 136 extends from its forward end above the ear to its back end, which is lower on the head and behind the ear. In certain cases, the pads 136 each have a contoured surface 138 for contacting the head of the user. A boom 140 extends from a rotatable base 142 near the bottom of one of the housings (e.g., as illustrated, the right housing 132A) and is used to position and support a microphone 144 attached at the other end. The boom 140 may be adjusted, in part, by rotation about its base 142 to place the microphone 144 in proper position with respect to the mouth of the user. The boom 140 may be permanently affixed to the housing 132A or may be removable so that the audio device 10 can be used for both aviation and non-aviation uses (e.g., music playback). A connector 146 for a communications cable extends from the bottom of the right housing 132A. An earpiece (e.g., earbud) connector cable 148 extends at one end from each housing 132. The opposite end of the flexible cable 148 is suitable for connecting to an earpiece such as an earbud or other type of in-ear headphone. Additional features of the audio device 10 in FIG. 2 are described in U.S. Pat. No. 10,187,718, which is entirely incorporated by reference herein. The example audio devices shown and described herein can take various additional form factors, including but not limited to audio eyeglasses, on-ear headsets, near ear headsets, or in-ear headsets.

As noted herein, various implementations include control modules for wearable devices, e.g., wearable audio devices. In some cases, these control modules can take a similar form as control module 125 (FIG. 1). In other cases, the control modules described according to various implementations can take any other form factor capable of performing control functions in a wearable device. In certain cases, the control module is a modular component that is configured to be connected and/or disconnected with the wearable device, such as a control module for an audio headset. In the example of the audio device 10 in FIG. 1, the control module 125 can include a hard-wired connection with the audio device 10 via connecting cable 120.

Figure 3:
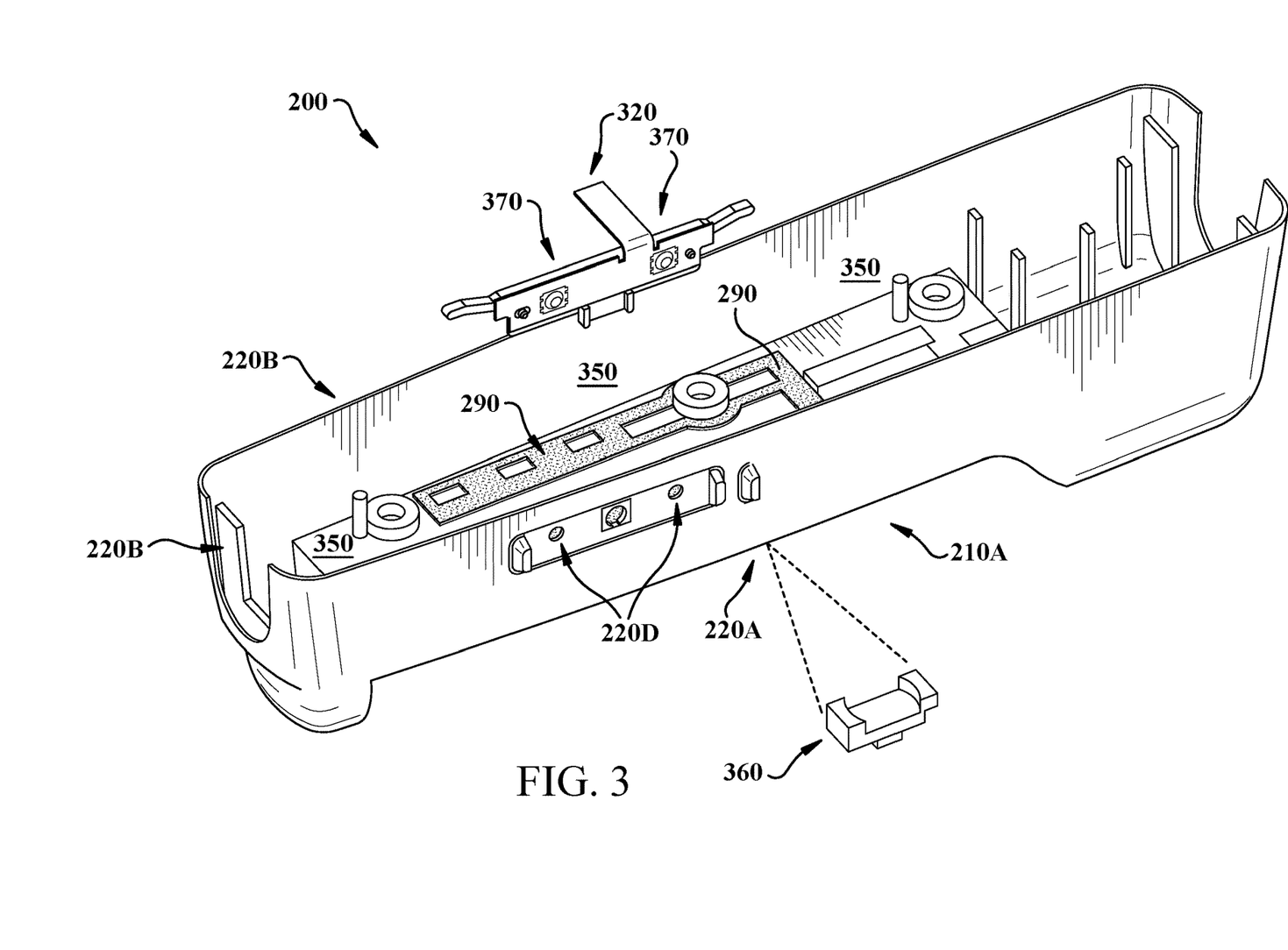
FIG. 3 is a perspective cut-away view of a control module according to various implementations.
Figure 4:
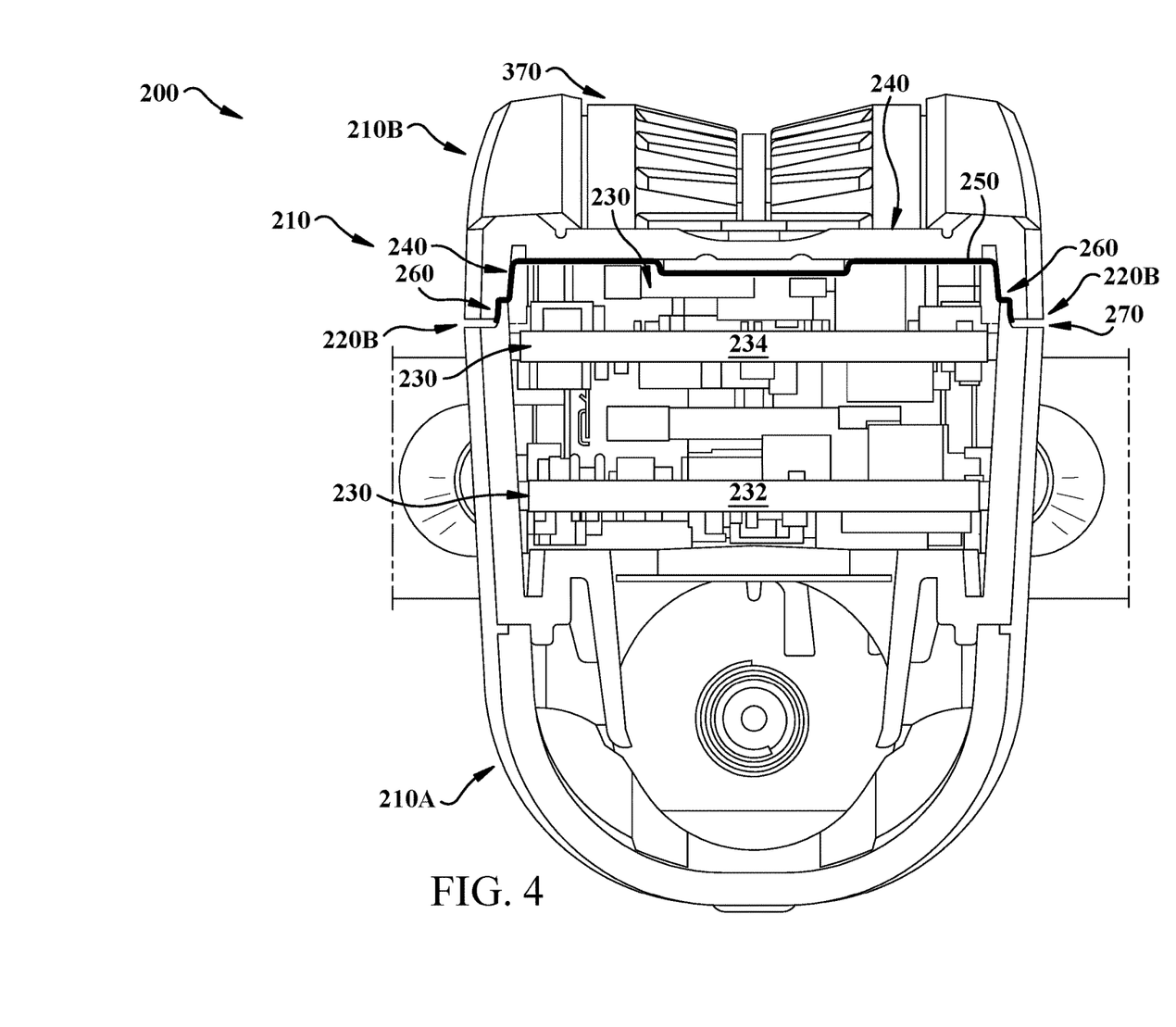
FIG. 4 is a partial cross-sectional view of a control module according to various implementations.

FIG. 3 illustrates an example of a section (e.g., lower section) of a control module 200 according to various implementations. It is understood that the control module 200 can be configured to connect with a wearable device such as the wearable audio devices 10 in FIGS. 1 and 2, and in some cases, is configured to connect to the audio device 10 via a connecting cable similar to connecting cable 120 shown in FIG. 1. In various implementations, the control module 200 includes a housing 210 that has at least one ESD ingress location 220. A lower section 210A of the housing 210 is illustrated in FIG. 3, and when assembled, the housing 210 includes a complementarily sized upper section 210 (FIG. 4) that encapsulates the electronic devices therein. In the example illustrated in FIG. 3, the housing 210 includes a plurality of ingress locations 220, which can include a device connector (or, external connector) location 220A, a gap (or, seam) in the housing 220B (e.g., between sections 210A, 210B of the housing 210), a vent 220C in the housing 210, or a hole 220D in the housing 210. In various implementations, the housing 210 is configured to house an electronic component such as one or more circuit boards, control chips, communication chips (e.g., Bluetooth communication chips), electrical connectors, switches, potentiometers, etc. The electronic components can also include interface controllers, e.g., for receiving inputs from one or more interface buttons. FIG. 4 illustrates an example sectional view of the housing 210 including electronic components 230 such as circuit boards, for example, an analog electronics circuit board (or, printed circuit board (PCB) such as a PCB-A) 232, such as an audio control circuit board, and a digital electronics circuit board 234 (or communication and/or power control circuit board) such as a Bluetooth communication and/or power printed circuit board.

Figure 5:
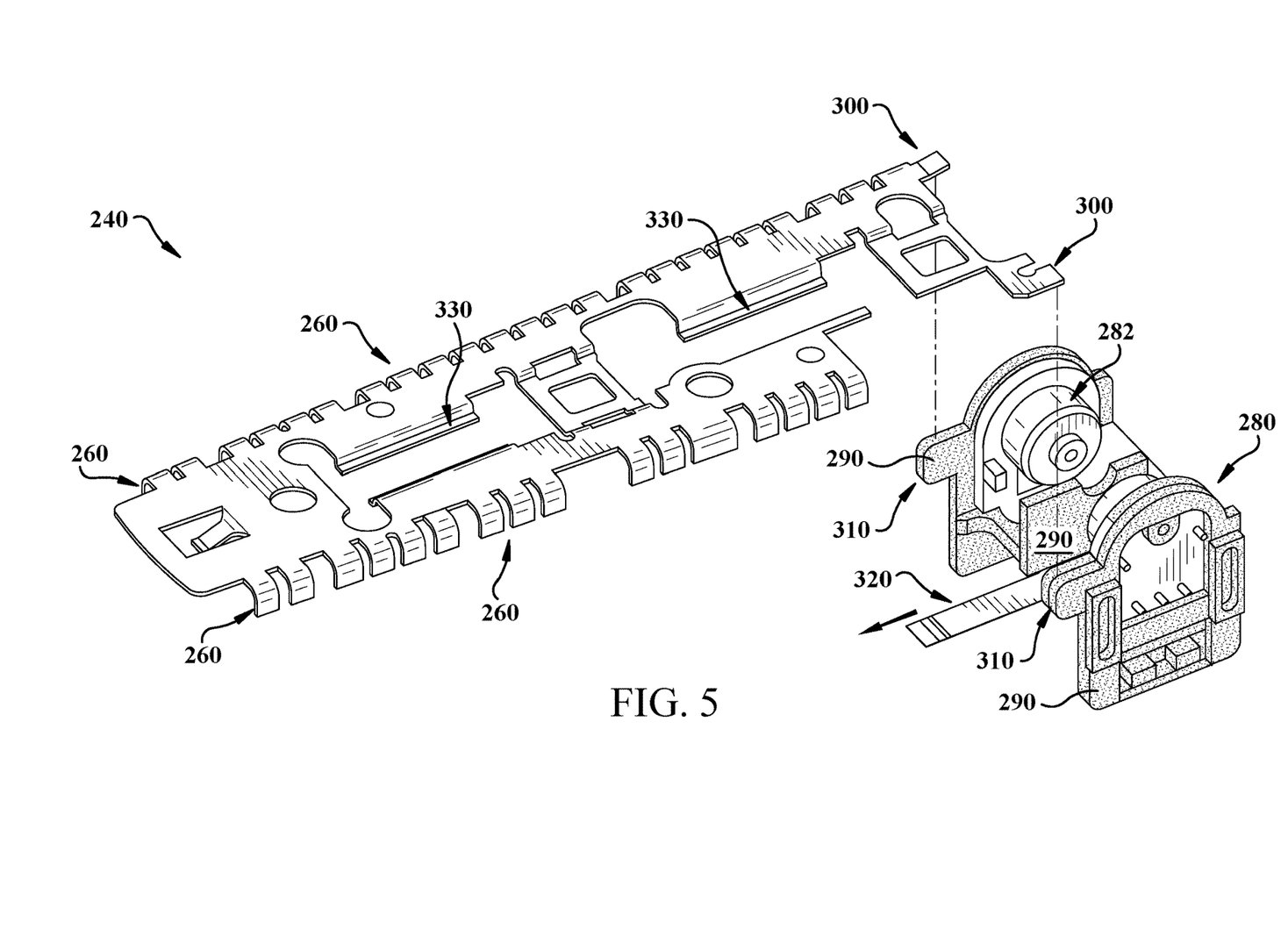
FIG. 5 shows isolated perspective views of a shield plate and potentiometer frame for a control module according to various implementations.

Also illustrated in FIG. 4 is a shield plate 240 contained in the housing 210 for providing ESD protection for the electronic component(s) 230. In various implementations, the shield plate 240 includes an electrically conductive material such as a metal or conductive composite. In one example, the shield plate 240 includes a stamped metal shield. According to various implementations, the shield plate 240 is adhered to the upper section 210B of the housing, e.g., via an adhesive such as a pressure-sensitive adhesive along the interface 250 between the shield plate 240 and the upper section 210B. FIG. 5 includes a perspective view of the shield plate 240 separated from the housing 210.

In certain cases, a portion (e.g., fingers) 260 of the shield plate 240 extends to the seam 220B in the housing 210 to provide a discharge path for electrostatic charge, e.g., to ground. For example, with reference to FIG. 4, fingers 260 are shaped to complement the profile of the seam 220B between the lower section 210A and the upper section 210B, e.g., including one or more bends or contours. As can be seen from FIG. 4, in some cases, the seam 220B can include a small air gap 270, which can allow electrostatic charge to pass therethrough, e.g., from outside the housing 210 to the interior of housing 210 where the electronic components 230 reside. The shield plate 240 can be shaped to divert the electrostatic charge from one or more locations in or around the housing 210 to ground, e.g., a system ground such as via the connecting cable 120 (FIG. 1). For example, FIG. 5 also shows an isolated perspective view of a potentiometer frame 280 for housing a potentiometer 282. In some cases, the potentiometer frame 280 can be coated in an electrically conductive paint 290 that is configured to transfer electrostatic charge therethrough (and away from other electronic components 230). In some cases, the shield plate 240 includes a set of discharge fingers 300 that are positioned to contact tabs 310 on the potentiometer frame 280 (alignment shown in dashed lines).

In various implementations, the shield plate 240 enables electrostatic charge that enters the housing 210 via one or more ESD ingress locations 220 to flow to the discharge fingers 300 and to the potentiometer frame 280. In certain cases, the potentiometer frame 280 is connected with a ground connector 320, e.g., an electrically conductive wire, that is coupled with a circuit board such as the analog electronics circuit board 232 (e.g., audio control PCB-A), which in turn is coupled with a cable 125. In particular implementations, the ground connector 320 is configured to divert ESD around the digital electronics circuit board 234 (FIG. 4) to discharge (to ground) via the analog electronics circuit board 232. In such cases, the analog electronics circuit board 232 is capable of acting as a conduit for ESD to protect the more sensitive digital electronics circuit board 234 from ESD. For example, the digital electronics circuit board 234 can include memory and a communications chip (e.g., BT communications chip) that is sensitive to ESD events, and as such, could be damaged or disabled by an ESD strike.

With reference to FIG. 5, and in view of FIG. 3, the shield plate 240 can also be shaped to at least partially surround one or more ESD ingress locations 220 in the housing 210. In certain cases, the shield plate 240 is shaped to at least partially surround a plurality of ESD ingress locations 220 in the housing 210. For example, the shield plate 240 can include slots 330 to complement switch openings, such as sliding, toggle, or push-button switches on the control module 200. An example of a switch opening 340 for a switch in the control module 125 is illustrated in FIG. 1. Slots 330 (FIG. 5) can be configured to complement one or more switch openings 340 in the housing 210, e.g., in the upper section 210B.

In particular implementations, one or more portions of the shield plate 240 can be coated with a conductive paint, e.g., electrically conductive paint 290. In some cases, such as where the shield plate 240 is formed of a non-conductive electrical material (e.g., an insulator), the shield plate 240 can be at least partially covered in electrically conductive paint 290, similar to the potentiometer frame 280.

In additional implementations, the housing 210 includes electrically conductive paint 290, as illustrated in the example depiction of lower portion 210A in FIG. 3. In these cases, a portion of an inner surface 350 of the housing 210 is coated in electrically conductive paint 290, for example, in areas proximate to one or more ESD ingress location 220. In certain aspects, the electrically conductive paint 290 at least partially surrounds an ESD ingress location(s) 220, and in particular cases, the electrically conductive paint 290 extends into (e.g., partially coats the inner surface of) one or more holes 220D in the housing 210. At least partially surrounding the hole(s) 220D and/or at least partially coating the hole(s) 220D allows the conductive paint 290 to divert ESD from the ESD ingress location around sensitive electronic components such as the digital electronics circuit board 234.

In certain cases, the electrically conductive paint 290 can provide a discharge path along the inner surface 350 of the housing 210 (e.g., along the inner surface 350 of the lower portion 210A of housing 210) to a device connector 220A such as an external connector location (e.g., a USB connector location). In particular examples, the conductive paint 290 can extend from one or more ESD ingress locations 220 to the device connector 220A. In additional examples, the device connector 220A can include a conductive gasket 360 (shown separated from the slot in which it is mounted) that is electrically coupled with the electrically conductive paint 290 to provide a discharge path for ESD to ground (e.g., via the external connector). The conductive gasket 360 can include conductive silicone in some cases. In particular examples, the ground connector 320 (FIG. 5) is electrically connected with the conductive paint 290 along the lower portion 210A of the housing to enable ESD via the conductive paint 290 and device connector 220A (e.g., via conductive gasket 360).

In particular cases, e.g., where the control module 200 is configured to connect to an aviation headset such as illustrated in FIGS. 1 and 2, the shield plate 240, potentiometer frame 280 (coated with electrically conductive paint 290), and/or conductive paint 290 on frame 210 can provide ESD protection for the housing 210 and aid in compliance with an ESD protection standard for the aviation headset, e.g., a United States Federal Aviation Administration (FAA) ESD standard or threshold for aviation headsets. In some cases, the ESD protection standard is characterized by at least 15 kilovolts (kV) of ESD protection.

Figure 6:
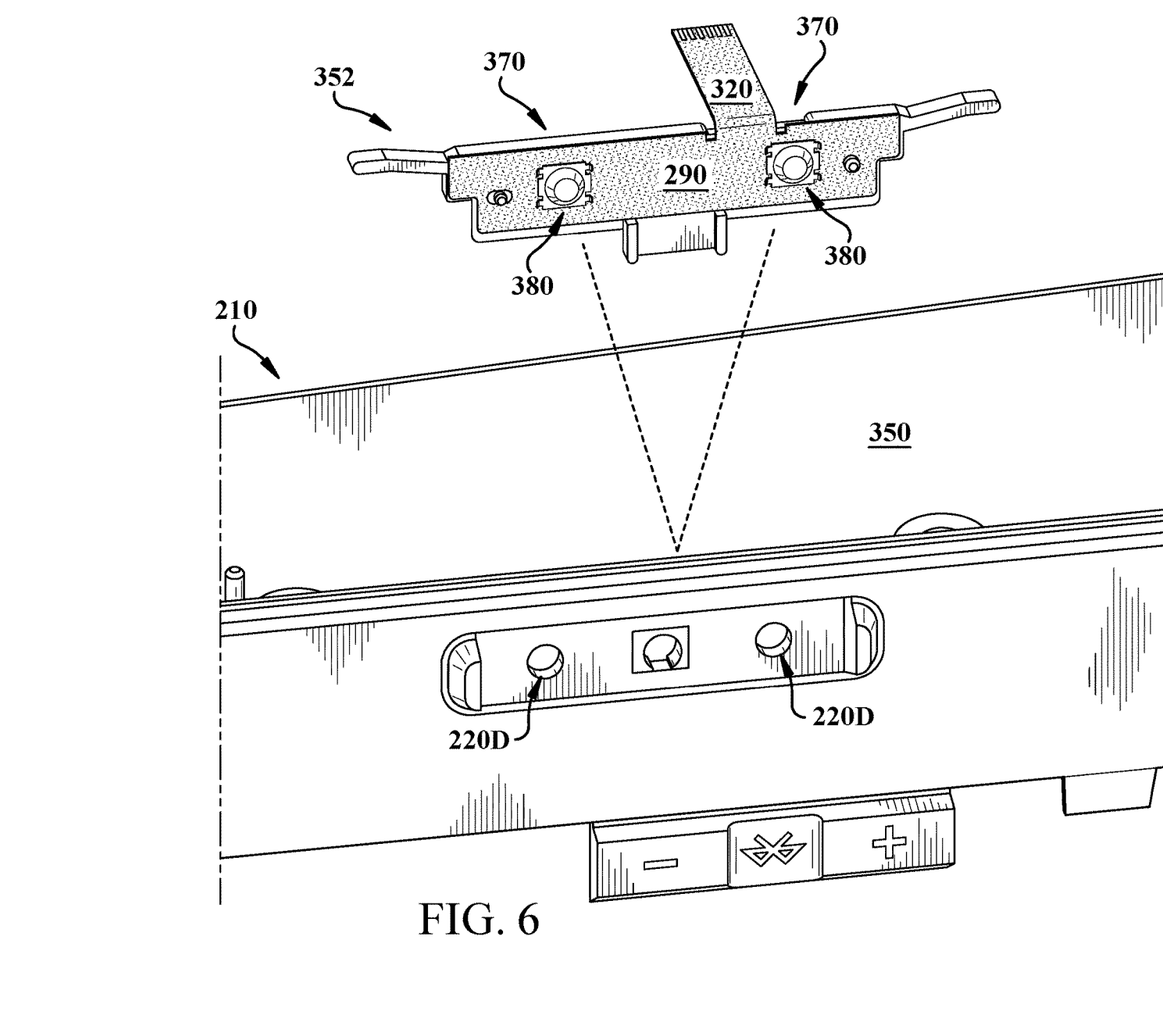
FIG. 6 is a perspective view of a set of interface buttons according to various implementations.

In various additional implementations, the control module 200 can include one or more physical interface buttons. For example, physical interface buttons 370 can be located on the control module 125 (FIG. 1) to enable controls such as power on/off, toggling between operational modes, or volume control. In some implementations, the physical interface buttons 370 can present challenges in terms of ESD ingress control, because certain types of control module 200 can include a nominal air gap around the physical interface button 370 to enhance tactile response for the user (e.g., to enhance the feel of the interface button 370). In certain cases, the physical interface buttons 370 are at least partially surrounded by an insulator (e.g., a co-molded elastomer) on the housing 210 for mitigating ESD ingress, e.g., through the air gap. FIG. 6 illustrates the interior surface 350 of housing 210 including close-up view of a button mount 352 for mounting interface buttons 370 on the interior surface 350. FIG. 6 also shows an insulator 380 at least partially surrounding the interface buttons 370. In particular cases, the insulator 380 spans one or more gaps in the mount 352 behind the visible portion of the interface button 370, e.g., between sections of the mount 352 inside the housing 210. In particular cases, the mount 352 is at least partially coated with conductive paint 290, such that the buttons 370 are mounted through sections of the mount 352 not coated by the paint 290. In some cases, the insulator 380 spans between sections of conductive paint 290 on the mount 352. In certain cases, the insulator 380 extends at least partially annularly around the interface button 370 to insulate nearby electronic devices from an ESD strike from the air gap proximate interface button 370.

Figure 7:
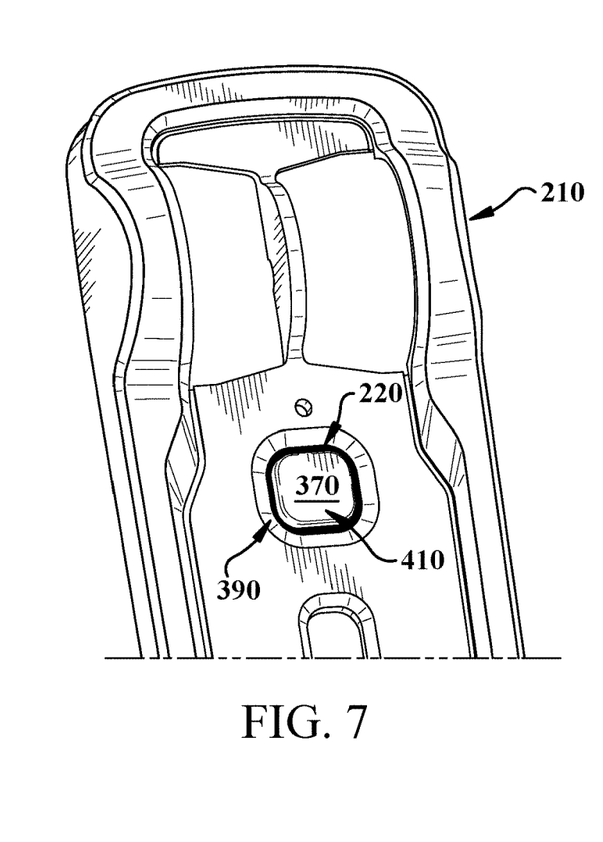
FIG. 7 is an external view of a housing including an interface button according to various implementations.
Figure 8:
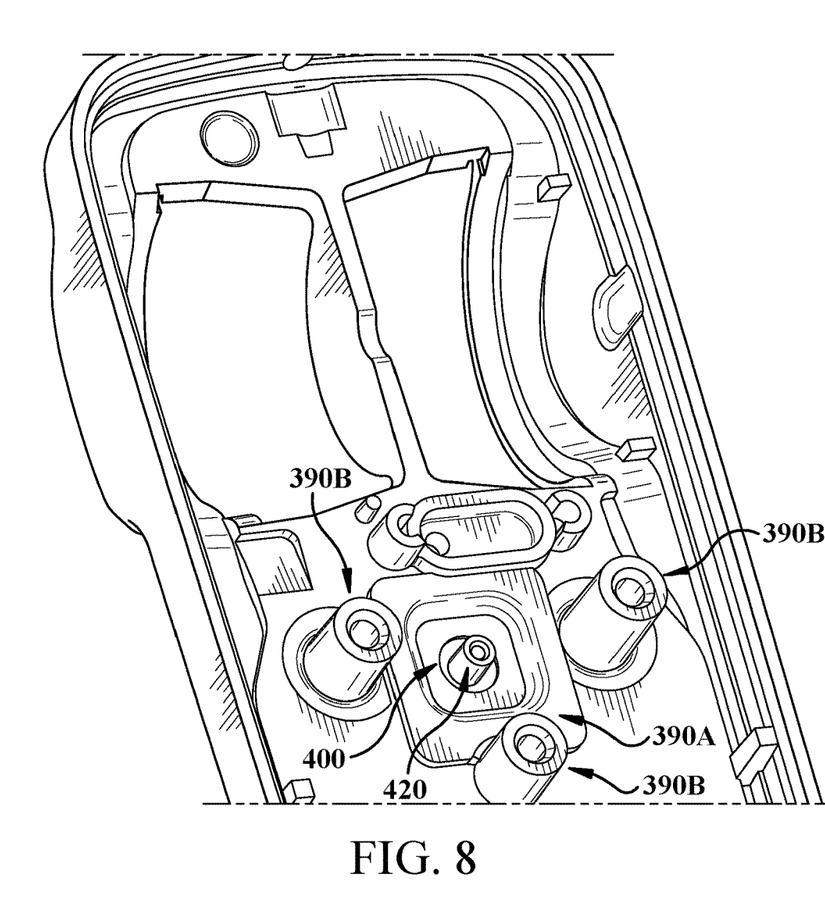
FIG. 8 is an internal view of the housing in FIG. 7, including the interface button, according to various implementations.

In additional implementations, as shown in FIGS. 7 and 8 depicting internal, and external views of a section of housing 210, respectively, the control module 200 can include a grounding element 390 coupled to the interface button 370, e.g., on side opposing the visible surface of the interface button 370. The grounding element 390 can be configured to provide ESD protection for the ESD ingress location 220 proximate the interface button 370. In particular cases, e.g., where the control module 200 is configured to connect to an aviation headset such as illustrated in FIGS. 1 and 2, the grounding element 390 can provide ESD protection for the housing 210 and aid in compliance with an ESD protection standard for the aviation headset, e.g., at least 15 kilovolts (kV) of ESD protection.

In a particular example illustrated in FIG. 8, the grounding element 390 includes a ground ring 390A that at least partially surrounds the physical interface button 370. In some cases, the ground ring 390A is an annular component such as a metal ring or other electrically conductive ring of material that is configured to divert ESD from the gap around the interface button 370, e.g., to the shield plate 240 and/or electrically conductive paint 290 along the inner surface of the housing 210 in one or more locations.

In additional implementations, as illustrated in FIG. 8, the grounding element 390 can include a set of ground pins 390B proximate to (e.g., adjacent to) an internal surface 400 of an interface button 370. The internal surface 400 opposes an external (e.g., outwardly visible) surface 410 of the interface button 370. In various implementations, the ground pins 390B are oriented such that signal pins 420 that are most sensitive to ESD events are farther from the ESD ingress location 220 around button 370 than the ground pins 390B. In some examples, an insulator such as an adhesive (e.g., glue) coats at least a portion of the signal pins 420 to further protect those signal pins 420 from ESD.

In any case, the grounding element 390 can be coupled with a system ground for the aviation headset 10, e.g., via the ESD diversion path(s) for the control module 200 such as via the shield plate 240, conductive paint, etc.

In contrast to conventional devices, the control modules and associated audio devices according to various implementations provide a number of benefits. For example, the control modules disclosed herein can provide ESD protection for connected devices such as connected audio devices. In some examples, audio devices employing the control modules disclosed herein can benefit from one or more ESD mitigation features such as a shield plate, electrically conductive paint, conductive potentiometer frame, ground pins and/or ground ring around interface buttons, and/or insulators proximate to interface buttons and/or signal pins. The audio devices shown employing the control modules according to various implementations can enhance the user experience, as well as improve performance, relative to conventional audio devices, for example, conventional aviation headsets.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. A control module configured to connect to a wearable device, the control module comprising:
    a housing having at least one electrostatic discharge (ESD) ingress location,
    an electronic component in the housing,
    a shield plate contained in the housing and connected to ground, the shield plate providing ESD protection for the electronic component;
    a conductive paint proximate the at least one ESD ingress location and connected to ground, the conductive paint providing ESD protection for the electronic component; and
    a device connector in the housing electrically connected to the conductive paint, wherein the device connector includes a conductive gasket extending through an opening in the housing, wherein the conductive gasket provides a system ground connection.

2. The control module of claim 1, further including a conductive paint on at least a portion of the shield plate.

3. The control module of claim 1, wherein the conductive paint at least partially surrounds the at least one ESD ingress location.

4. The control module of claim 1, wherein the at least one ESD ingress location comprises a set of holes, and wherein the conductive paint at least partially fills one or more of the set of holes.

5. The control module of claim 1, wherein the device connector includes a universal serial bus (USB) connector.

6. The control module of claim 1, wherein the conductive gasket includes conductive silicone.

7. The control module of claim 1, wherein the at least one ESD ingress location includes one or more of: an external connector location, a gap between sections of the housing, a seam in the housing, or a vent in the housing.

8. The control module of claim 1, wherein the shield plate is shaped to at least partially surround the at least one ESD ingress location in the housing.

9. The control module of claim 8, wherein the shield plate is shaped to at least partially surround a plurality of the ESD ingress locations in the housing.

10. The control module of claim 1, further including a digital electronics circuit board and an analog electronics circuit board, wherein the shield plate is configured to divert ESD around the digital electronics circuit board to discharge via the analog electronics circuit board.

11. The control module of claim 10, wherein the digital electronics circuit board includes memory and a communications chip.

12. The control module of claim 1, further including:
    a set of physical interface buttons on the housing for receiving user interface commands, and
    co-molded elastomer surrounding each of the physical interface buttons on the housing for mitigating ESD ingress.

13. The control module of claim 1, wherein the wearable device includes an aviation headset.

14. The control module of claim 13, wherein the shield plate provides ESD protection for the housing and aids in compliance with an ESD protection standard for the aviation headset.

15. The control module of claim 14, wherein the ESD protection standard is characterized by at least 15 kilovolts (kV) of ESD protection.

16. A control module configured to connect to an aviation headset, the control module comprising:
    a housing,
    an electronic component in the housing,
    a physical interface button on the housing proximate to an electrostatic discharge (ESD) ingress location, and
    a grounding element coupled to the physical interface button and configured to provide ESD protection for the ESD ingress location,
    wherein the grounding element provides ESD protection for the housing and aids in compliance with an ESD protection standard for the aviation headset, and
    wherein the grounding element includes a set of ground pins extending from an internal surface of the physical interface button.

17. The control module of claim 16, wherein the grounding element includes a ground ring at least partially surrounding the physical interface button.

18. The control module of claim 16, wherein the internal surface opposes an external surface that is visible from an exterior of the housing.

19. The control module of claim 16, further including an insulator at least partially surrounding the physical interface button.

20. The control module of claim 16, wherein the grounding element is coupled with a system ground for the aviation headset.

21. The control module of claim 16, wherein the ESD protection standard is characterized by at least 15 kilovolts (kV) of ESD protection.

22. A control module configured to connect to a wearable device, the control module comprising:
    a housing having at least one electrostatic discharge (ESD) ingress location,
    an electronic component in the housing,
    a shield plate contained in the housing and connected to ground, the shield plate providing ESD protection for the electronic component, and
    a digital electronics circuit board and an analog electronics circuit board, wherein the shield plate is configured to divert ESD around the digital electronics circuit board to discharge via the analog electronics circuit board.

23. The control module of claim 22, wherein the wearable device includes an aviation headset.

* * * * *